(12) United States Patent
Huwyler et al.

(10) Patent No.: US 10,119,506 B2
(45) Date of Patent: Nov. 6, 2018

(54) METHOD AND APPARATUS FOR MODIFYING AN OEM FUEL SYSTEM FOR BI-FUEL USE

(71) Applicant: Optimus Technologies, LLC, Pittsburgh, PA (US)

(72) Inventors: Colin N. Huwyler, Pittsburgh, PA (US); Jonathan Ewing, Pittsburgh, PA (US); Aaron Sieczkarek, Orchard Park, NY (US)

(73) Assignee: Optimus Technologies, Inc., Pittsburgh, PA (US)

( * ) Notice: Subject to any disclaimer, the term of this patent is extended or adjusted under 35 U.S.C. 154(b) by 77 days.

(21) Appl. No.: 15/330,975

(22) Filed: Apr. 2, 2015

(65) Prior Publication Data

US 2018/0156173 A1    Jun. 7, 2018

Related U.S. Application Data

(60) Provisional application No. 61/973,890, filed on Apr. 2, 2014.

(51) Int. Cl.
| | |
|---|---|
| *F02M 37/00* | (2006.01) |
| *F02D 19/00* | (2006.01) |
| *F02D 19/02* | (2006.01) |
| *F02M 43/02* | (2006.01) |
| *F02M 37/22* | (2006.01) |

(52) U.S. Cl.
CPC ......... *F02M 37/0064* (2013.01); *F02D 19/00* (2013.01); *F02M 37/22* (2013.01); *F02M 43/02* (2013.01)

(58) Field of Classification Search
CPC .... F02M 37/0064; F02M 37/22; F02M 43/02; F02D 19/00; F02D 19/02; F02D 19/023
See application file for complete search history.

(56) References Cited

U.S. PATENT DOCUMENTS

2015/0192082 A1*   7/2015   Guerreiro ............... F02D 41/14
                                                         123/456

* cited by examiner

*Primary Examiner* — Jacob Amick
(74) *Attorney, Agent, or Firm* — Carl A. Ronald

(57) ABSTRACT

The present invention is a system and method for adapting and modifying an existing mono-fuel delivery system for an internal combustion engine to run as a bi-fuel system by reusing and repurposing OEM components of the mono-fuel system. The bi-fuel system makes use of an integration plate that may be mounted to the system fuel filter in substantially the same location as the fuel filter is mounted in the mono-fuel configuration. The integration plate also may deliver either fuel types into the existing engine fuel intake port thus the system does not require the creation of a secondary fuel intake port for the secondary fuel. The integration plate may also be situated such that it minimizes the space it must use within the engine compartment and it may use the preexisting engine mounting points designed for the fuel filter in the mono-fuel system.

20 Claims, 6 Drawing Sheets

METHOD AND APPARATUS FOR MODIFYING AN OEM FUEL SYSTEM FOR BI-FUEL USE

CROSS-REFERENCE TO RELATED APPLICATION

This application claims the benefit of U.S. Provisional Patent Application Ser. No. 61/973,890 entitled "Plate for Integration of Bi-Fuel System" filed on Apr. 2, 2014, the contents of which are incorporated by reference as if fully set forth herein.

FIELD OF INVENTION

The present invention relates to fuel delivery systems for internal combustion engines and more particularly, fuel delivery systems utilizing more than one type of fuel for internal combustion.

BACKGROUND OF INVENTION

A bi-fuel delivery system is understood to be any engine system that is capable of operating on two different types of fuel. Conversion from a mono-fuel system, such as a diesel fuel combustion engine commonly found in heavy-duty trucks and buses sold by large-scale manufacturers of such vehicles, to a bi-fuel system is advantageous because it typically results in the reduction of total fuel costs and lower vehicle emissions. There are, however, several challenges to converting a mono-fuel system into a bi-fuel system. In a standard, OEM configuration fuel system for an internal combustion engine, known in the art, the fuel systems are arranged for the use of only one type of fuel. For production efficiency, the components of the standard fuel delivery system are not manufactured with any intention for the system to contain or handle more than one type of fuel. Additionally, due to ever increasingly cramped engine compartments, retrofitting and adding new or modified components to a fuel system has become increasingly challenging. As a result, there is a need for reusing/repurposing as many OEM components as possible to allow for the installation of a bi-fuel delivery system on a cost-effective basis.

For compression ignition engines that are designed to run on diesel fuel, the fuel system generally has a diesel fuel tank, a fuel strainer, a fuel filter/water separator, and fuel lift pump that pressurizes the diesel fuel before it enters the engine via a fuel rail inlet port. These components are all designed without the intention to operate in a bi-fuel system environment, and as the present invention shows, these components require substantial modification and repurposing to run in the bi-fuel environment. One particular concern when adapting a system to run in a bi-fuel environment is minimizing cross contamination of the fuels to maximize the efficiency of how each fuel burns in the engine. As a result, converting a mono-fuel system to a bi-fuel system requires substantial repurposing and custom modification in order for the system to run in a fuel efficient manner.

SUMMARY OF INVENTION

The present invention comprises a bi-fuel delivery system that repurposes existing OEM components of a mono-fuel delivery system in order to minimize both cross contamination of fuel and engine space needed for conversion. In particular, the system utilizes a specialized integration plate that allows the existing engine fuel inlet port to be repurposed for bi-fuel delivery. Additionally, the present invention repurposes a fuel lift pump and fuel filter, where the fuel filter is modified to run under vacuum pressure and is mounted to the integration plate such that it is in substantially the same location as in its OEM configuration. Furthermore, the present invention minimizes the amount of shared fuel line due to the placement of the fuel selector valve within the system. Finally, the bi-fuel system of the present invention has the advantage of having a fuel pressure relief valve situated within an integration plate that may be tied to the fuel selector valve in order to maintain optimal operating pressure when either fuel source is in use.

DETAILED DESCRIPTION OF THE INVENTION

The following detailed description includes the best currently contemplated modes of carrying out exemplary embodiments of the invention. The description is not to be taken in a limiting sense, but is made merely for the purpose of illustrating the general principles of the invention, since the scope of the invention is best defined by the claims included herein.

Figure 1:
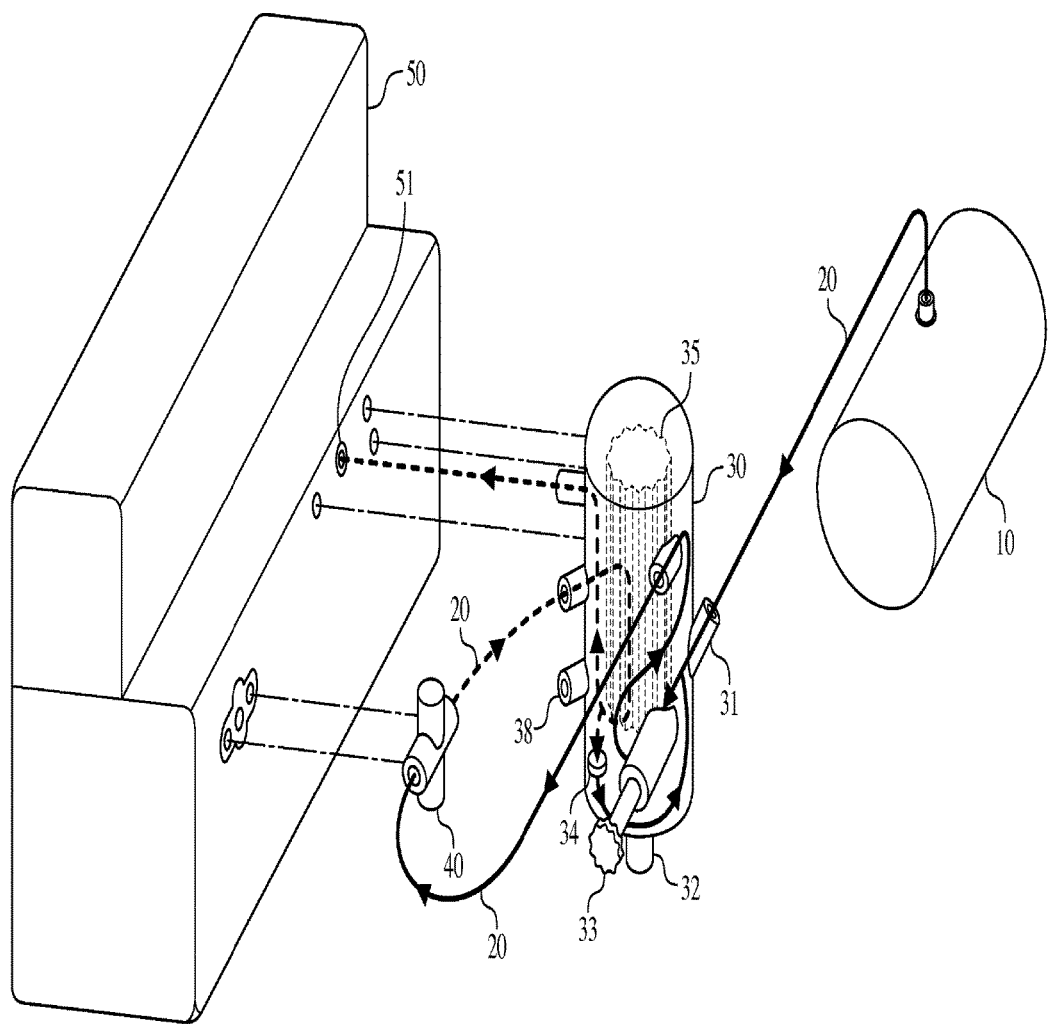
FIG. 1 is a perspective view of a prior art fuel delivery system that the present invention improves upon.

In order to best understand the modifications and improvements made to create a bi-fuel delivery system, a detailed description of an existing mono-fuel delivery system is necessary. FIG. 1 depicts a standard diesel fuel delivery system that may consist of a diesel tank 10, a diesel fuel line 20, a fuel filter housing 30, a quick coupling 31, a mesh strainer/fuel heater 32, a manual pressure pump 33, a fuel regulation value 34, a fuel lift pump 40, a primary fuel filter/water separator element 35, a fuel inlet port 51, and an engine 50. In the mono-fuel system, the fuel lift pump 40 may create a negative pressure in the diesel fuel line 20 from the diesel fuel tank 10 to the fuel lift pump 40, and a positive pressure from the fuel lift pump 40 to the engine 50. The diesel fuel may flow from the diesel tank 10 into the fuel filter housing 30, through the quick coupling 31 then through the mesh strainer/fuel heater 32 and into the manual pressure pump 33. The manual pressure pump 33 may be used to prime the system if fuel system is not currently pressurized prior to operation of the system. The manual pressure pump 33 may be a hand pump such as a piston driven pump. After the diesel fuel flows through the manual pressure pump 33, the diesel fuel may flow out of the fuel filter housing 30 and into the fuel lift pump 40. The fuel lift pump 40 may be powered by being connected to a gearbox that is coupled with the camshaft or the gearshaft of the engine (not shown). In this configuration, the revolutions per minute (RPM) of the engine 50 determines the proportional speed that the fuel lift pump 40 may pump the diesel fuel. From the fuel lift pump 40, the diesel fuel flow into the fuel filter housing 30, and into the primary fuel filter/water separator element 35. The primary fuel filter/water separator element 35, may remove contaminates and water from the diesel fuel prior to entering the engine 50. After the diesel fuel is filtered, the diesel fuel enter the engine 50 via a fuel inlet port 51 and then flows into the engine fuel rail. If the pressure of the fuel is beyond a set threshold, the diesel fuel may pass from the from the primary fuel filter/water separator element 35 through a fuel regulation valve 34 into the fuel filter housing 30 between the quick coupling 31 connection and the mesh strainer 32. This mono-fuel system may also contain various pressure check sensors and drain ports throughout the system.

Figure 2:
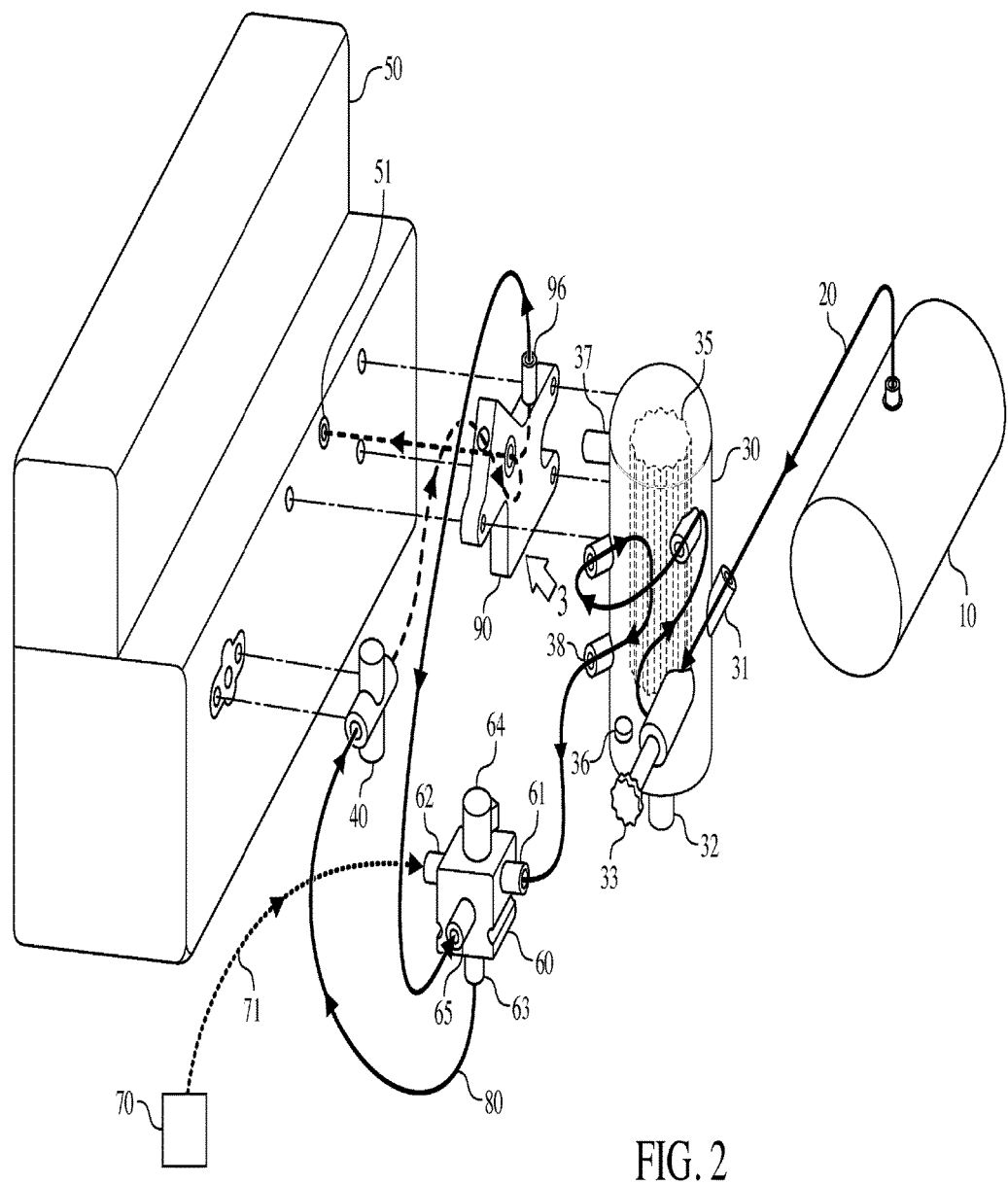
FIG. 2 is a perspective view of an exemplary embodiment of the fuel delivery system of the present invention.

FIG. 2 depicts an embodiment of the present invention where the standard mono-fuel system has been modified to work within a bi-fuel environment. In the modified configuration of a mono-fuel system converted to a bi-fuel system, there may be a diesel tank 10, a diesel fuel line 20, a fuel filter housing 30, a quick coupling 31, a mesh strainer/fuel heater 32, a manual priming pump 33, a bypass plug 36, a filter outlet plug 37, a primary fuel filter/water separator element 35, a bypass outlet port 38, a fuel selection value 60, a bio fuel line 71, a shared fuel line 80, a fuel lift pump 40, an integration plate 90, a fuel inlet port 51, a fuel regulation valve 91, and an engine 50.

In one embodiment, the diesel tank 10 may be an OEM diesel tank designed to hold diesel fuel in a mono-fuel designed fuel system. The diesel fuel line 20 may be an OEM diesel fuel line designed for a mono-fuel system. The fuel filter system may consist of a fuel filter housing 30, quick coupling 31, mesh strainer/fuel heater 32, manual priming pump 33, bypass plug 36, filter outlet plug 37, bypass outlet port 38, and a primary fuel filter/water separator element 35. In one embodiment, the fuel filter system is a modified OEM component. The fuel filter system may be modified from its OEM configuration such that the fluid flow is redirected after the manual priming pump 33 by a bypass plug 36 and fluid is redirected through a bypass coupling into the primary fuel filter/water separator element 35. In one embodiment the fuel filter bypass may be modified such that the fluid flows out of the fuel filter system from the OEM vacuum fluid outlet port, into the OEM pressurized inlet port, through the filter media and out through a repurposed water valve check port converted into a bypass outlet port 38. In one embodiment, the fuel filter system may be modified such that the entire system operates under a negative pressure created by the fuel lift pump 40. The OEM outlet port may be blocked by a plug 37. In one embodiment, the OEM outlet port may be blocked by the integration plate 90.

The fuel selection valve 60 may be connected to a diesel fuel line 20 via an inlet to the diesel tank 61, a bio fuel line 70 via an inlet to the bio fuel tank 62 and a shared fuel line 80 via an outlet 63 to the engine 50. The fuel selection valve 60 may be actuated by an electronically controlled solenoid 64. The electronic control may be connected to an ECU (not shown) that is programmed to monitor the engine and fuel conditions required to efficiently run either diesel fuel or bio fuel through the engine. The fuel selection valve 60 may either be open to the diesel fuel line 20 or the bio fuel line 80 to allow either diesel fuel or bio fuel to flow to the engine 50. In one embodiment, the fuel selection valve 60 is designed such that mixing of the different fuel sources is minimized by rapidly switching the valve. In such an embodiment, only one fuel source is utilized by the engine at a time. In one embodiment, the fuel selection valve 60 may also contain a bio fuel loop valve that allows bio fuel to flow back to the bio fuel tank 70 when the fuel selection valve 60 is closed to bio fuel. The bio fuel line 71 may be pressurized by a fuel pump (not shown) that allows the bio fuel to flow in the closed loop when the fuel selection valve 60 is closed to the bio fuel side of the system. This secondary fuel pump's speed may be set manually by a set-screw or may be electronically controlled by an ECU.

The fuel lift pump 40 may be an OEM component designed to run in a mono-fuel system. In one embodiment, the fuel lift pump 40 may be powered by the engine via a gearbox (not shown) coupled to the flywheel of the engine and as a result the pumping speed of the fuel lift pump is determined by and proportional to the RPM's of the engine. In one embodiment, the fuel lift pump 40 may be the primary means of pressurizing the fuel system by creating a negative pressure on the diesel tank/bio fuel tank side and a positive pressure towards the engine. The fuel lift pump 40 may be connected to the shared fuel lines 80 on both the negative and positive pressure sides of the pump. In this embodiment, the fuel lift pump 40 may be exposed to both diesel fuel as well as bio fuel. It is contemplated in alternative embodiments that the fuel lift pump 40 may be located prior to the fuel selector valve 60 where the fuel lift pump 40 may only be exposed to one of the fuel sources.

Figure 3:
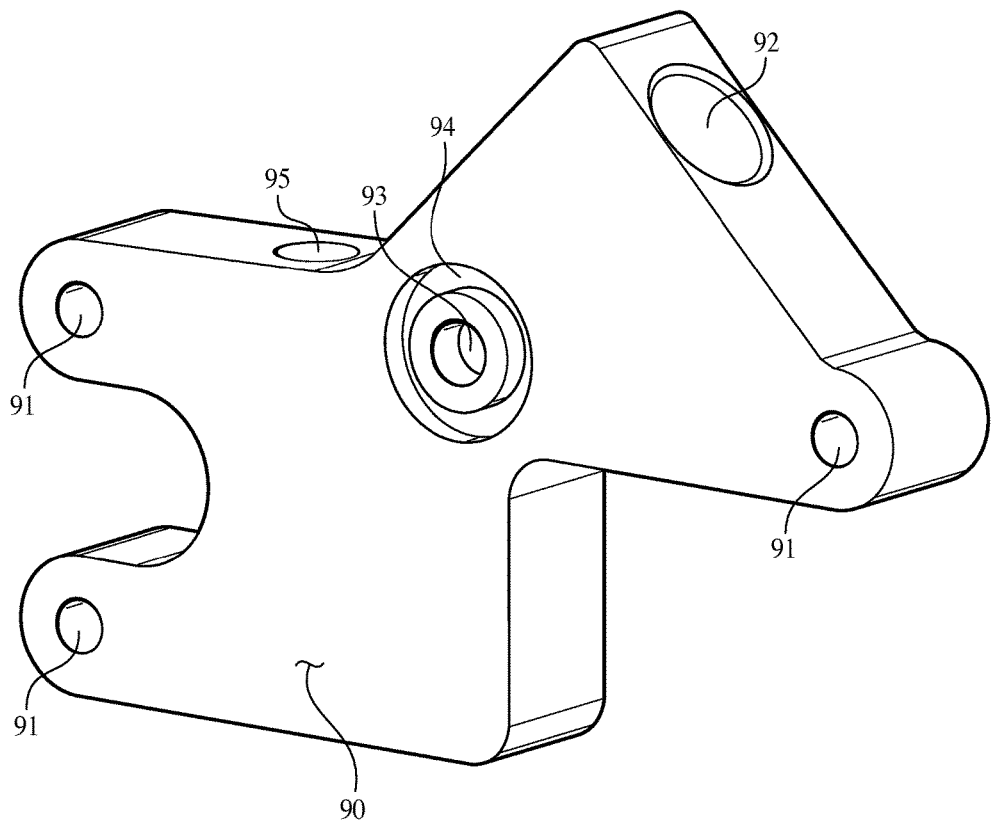
FIG. 3 is a perspective view of an exemplary embodiment of an integration plate of the fuel system, taken along line 3 in FIG. 2.
Figure 4:
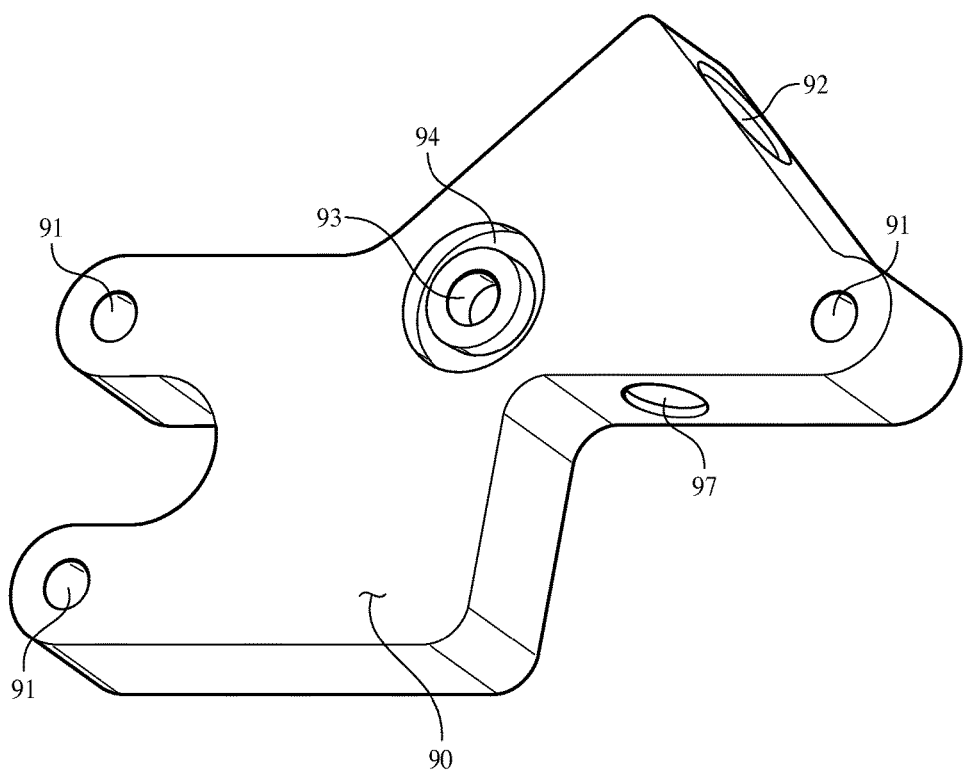
FIG. 4 is an angled view of an exemplary embodiment of an integration plate of the fuel system.
Figure 5:
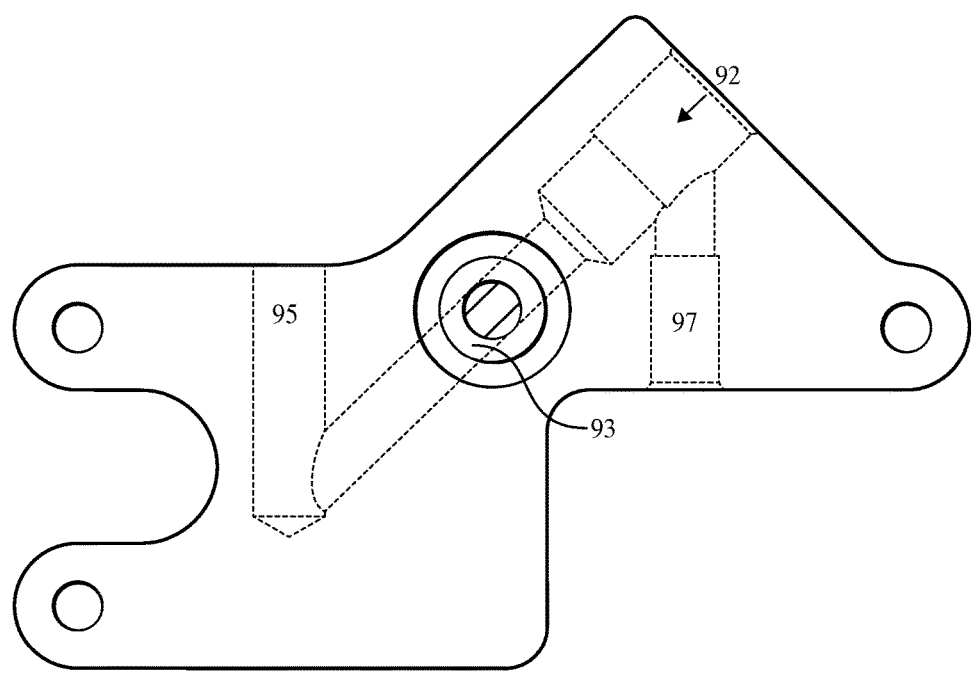
FIG. 5 is a frontal view displaying the internal portions of an exemplary embodiment of an integration plate of the present invention.

In one embodiment, the integration plate 90 may be connected to the fuel lift pump 40 via a shared fuel line 80. The integration plate 90 may allow for the flow of fuel into the engine 50 using the OEM fuel intake port 51. FIG. 3-5 provides a detailed view of one embodiment of an integration plate 90 used in the present invention. The integration plate have mounting holes 91 situated such that they line up with OEM mounting points 52 on the engine 50. In one embodiment, the mounting holes 91 line up with the mounting points 52 that are designed to be used with the OEM fuel filter housing 30. In this embodiment, the integration plate 90 is adapted to provide mounting points for the OEM fuel filter housing 30. In one embodiment, the integration plate 90 is mounted between the engine 50 and the fuel filter housing 30 such that the fuel filter housing 30 is located in substantially the same location as in the OEM configuration. In such an embodiment, the integration plate 90 may fit flush to the fuel filter outlet 37 in order to block the passage of any fluid through the outlet. It is contemplated that the design of the integration plate 90 and location of the mounting points 91 may vary by engine configuration. The asymmetrical design shown in FIG. 3-5 provides that the integration plate 90 conform to the engine fuel rail and remain as unobtrusive to the engine compartment as possible. In one embodiment, a single set of bolts may be used to attach the fuel filter housing 30 and the integration plate 90 to the engine 50 by passing the bolts though the integration plate mounting points 91.

The integration plate 90 may have a shared fuel inlet 92 and a fuel exit port 93 which may be the final delivery port before the engine 50 is introduced with either the primary or alternative fuels. In one embodiment, the integration plate 90 may have a gasket gland 94 which may house an o-ring which may create a sealing surface against the engine fuel intake port 51. The gasket may vary extensively in alternative embodiments in make and shape as determined by the engine configuration. The gasket that is seated may create a face seal around the engine fuel rain inlet port 51 which may prevent leakage of the primary or alternative fuel. In an alternative embodiment, the fuel exit port 93 may be configured to screw into a threaded engine fuel intake port 51 such that it forms a threaded coupling. The integration plate 90 may also have relief port 95 that may house a regulation value 96. The regulation valve 96 may have a cracking pressure set according to the specifications of the engine being utilized in the system. In one embodiment, if the fuel pressure is beyond the cracking pressure, the regulation valve 96 may open and allows fuel to flow to a fuel regulation port 65 in the fuel selector valve 60. The integration plate may be created out of a material that will be suitably non-reactive to the alternative fuels that the integration plate may be exposed to, such as aluminum and stainless steel.

FIG. 4 depicts an embodiment where the integration plate 90 may contain a pressure sensor port 97. The pressure sensor 98 may allow for analysis and measurement of the fuel system pressure prior to the fuel entering the engine fuel rail. The pressure sensor port 97 may accommodate a pressure sensor of an equivalent size of the port. In alternative embodiments, the pressure sensor port 97 may be absent or plugged with an equivalent sized sealing device. FIG. 5 depicts an internal perspective of the integration plate 90 that shows the passage where fuel may flow from the integration plate inlet port 92 to the fuel exit port 93 or the fuel relief port 95.

Figure 6:
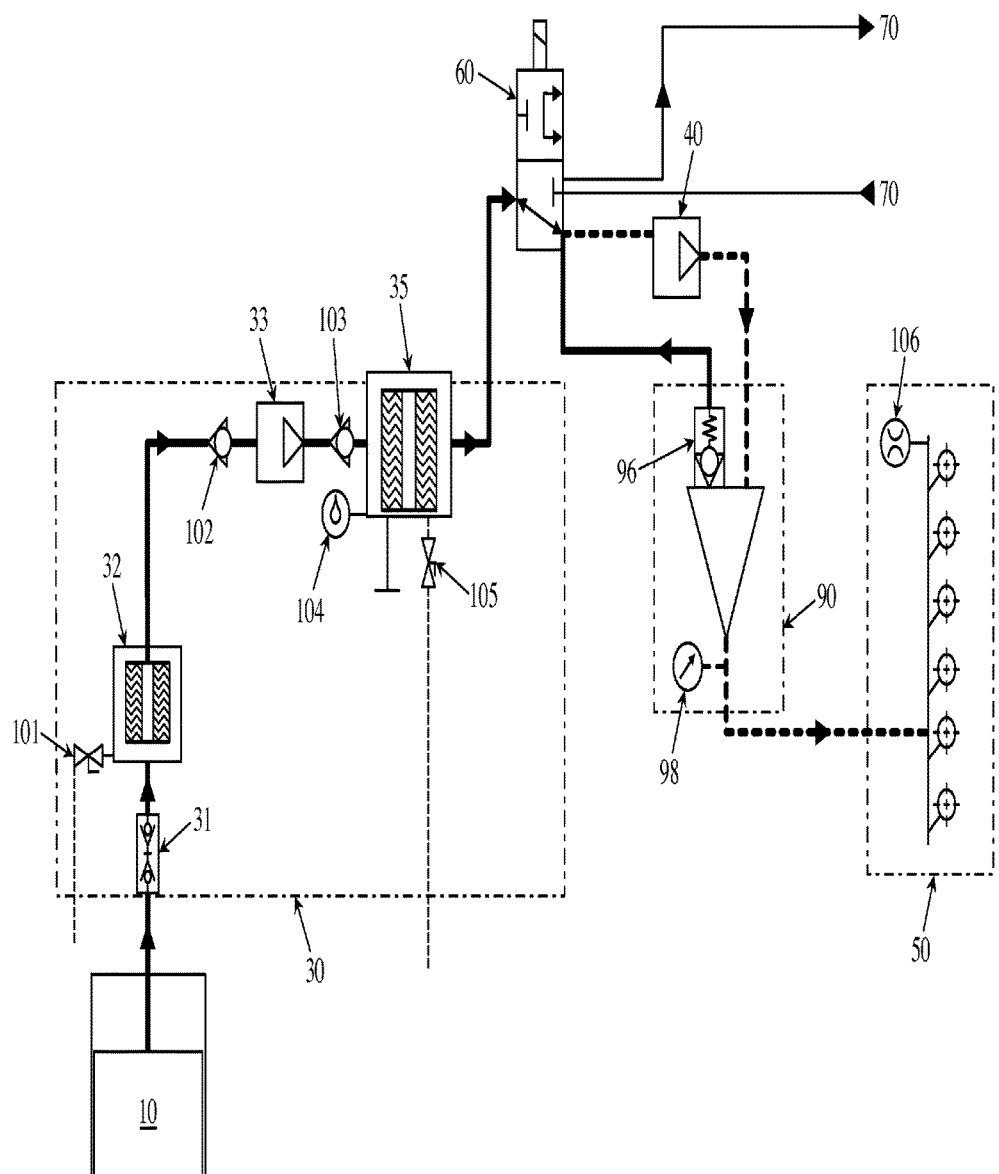
FIG. 6 is schematic diagram of an alternative embodiment of a bi-fuel delivery system.

FIG. 6 depicts a schematic of an alternative embodiment with the placement of additional check valves, sensors, drain ports and test ports. A strainer valve 101 may be connected before the mesh strainer/fuel heater 32. There may be a first check valve 102 prior to the manual priming pump 33 and a second check valve 103 between the manual priming pump 33 and the primary fuel filter/water separator element 35. The primary fuel filter/water separator element 35 may be connected to a water-in-filter sensor 104, and a water drain 105. An engine fuel pressure sensor 98 may be connected to the integration plate 90. An air bleed pressure test point 106 may be connected to the engine 50. In one embodiment the air bleed pressure test point 106 may be a Schrader valve.

In one embodiment, the diesel fuel line 20 is under a negative pressure created by the fuel lift pump 40. If the fuel selector valve 60 is open to allow diesel fuel pass through the valve, then diesel fuel may flow from the diesel fuel tank 10 through the quick coupling 31 and into the fuel filter housing 30. In one embodiment, the diesel fuel may flow within the fuel filter housing 30 such that it passes through the mesh strainer/fuel heater 32, manual priming pump 33, and though a bypass routed from the manual priming pump 33 through the primary filter/water separator element 35 and out of the fuel filter housing 30. In this embodiment, the diesel fuel passes through the entire fuel filter housing 30 while under a negative pressure created by the fuel lift pump 40. After passing the through the fuel filter housing 30, the diesel fuel may pass though the fuel selector valve 60, so long as the valve is open to allow diesel fuel to pass. After passing through the fuel selector valve 60, the diesel fuel may pass though the fuel lift pump 40 and then may be pumped into the integration plate 90. The diesel fuel may flow through the integration plate 90 through the integration plate inlet port 92, and may exit through the fuel outlet port 93 where the diesel fuel may then pass into the engine fuel inlet port 51 and into the engine fuel rail.

In one embodiment, bio fuel is used if the fuel selector valve 60 is open to the bio fuel side 63, and closed to the diesel side 61 and the bio fuel may flow toward the engine 50. The bio fuel system 70 may consist of a fuel tank, fuel heater, fuel pumps and other necessary components to condition the bio fuel to be burned in the engine 50. These necessary conditions may be the reaching a given operating temperature of the engine, and reaching a threshold temperature of the bio fuel and/or maintaining a desired fuel pressure. In one embodiment, the bio fuel may flow to the fuel selector valve 60 via a bio fuel line 71 and into the fuel lift pump 40 via a shared fuel line 80. The fuel lift pump 40 may then pump the bio fuel into the integration plate 90 via the inlet port 92. The bio fuel may then flow through the integration plate 90 and out to the engine fuel intake port 51 via the integration plate fuel exit port 93. If the pressure of the bio fuel is too high, the fuel pressure regulation valve 96 may open and allow the bio fuel to pass back to the fuel selector valve 60 via a fuel regulation port 65.

While the principle embodiment of the present invention utilizes diesel and bio fuel as the two fuels, it should be understood the methodology and inventive techniques utilized with the present invention could be used with alternative disparate fuel sources and different engine types, such as, but not limited to: gasoline, liquid natural gas, liquefied petroleum gas, straight vegetable oil, waste vegetable oil and other common fuels used in internal combustion engines.

It should be understood, of course, that the foregoing relates to exemplary embodiments of the invention and that modifications may be made without departing from the spirit and scope of the invention as set forth in the following claims.

We claim:

1. A fuel delivery system for an internal combustion engine where a plurality of fuels are delivered to the engine comprising:
   a fuel filter,
   a fuel selector valve coupled to the fuel filter,
   a fuel lift pump coupled to the fuel selector valve; and
   a fuel integration plate coupled to the fuel lift pump wherein the fuel integration plate is adapted to accept a plurality of fuels from the fuel selector valve and transmit the plurality of fuels into one or more engine fuel inlet ports wherein each engine fuel inlet port is a singular entry point for fuel into an engine and the engine fuel inlet port is originally designed for use with a single fuel source.

2. A fuel delivery system for an internal combustion engine of claim 1, wherein the fuel filter is mounted to the fuel integration plate such that the fuel filter is located in substantially the same position as in the fuel filter's original position in a single fuel delivery system.

3. A fuel delivery system for an internal combustion engine of claim 1, wherein the integration plate contains a pressure relief valve that is coupled to the fuel selector valve.

4. A fuel delivery system for an internal combustion engine of claim 1, where the fuel filter is adapted to run entirely under vacuum pressure created by the fuel lift pump.

5. A fuel delivery system for an internal combustion engine of claim 1, wherein the fuel integration plate blocks a fuel filter outlet port wherein the fuel filter outlet port is designed to couple to the engine fuel inlet port in a single fuel system.

6. A fuel delivery system for an internal combustion engine of claim 1, wherein the integration plate has at least one mounting point, wherein at least one mounting point couples with an engine mounting point, wherein the engine mounting point is adapted to couple with a fuel filter in a single fuel system.

7. A method of adapting a fuel system of an internal combustion engine that uses a single fuel source to utilize multiple fuel sources comprising the steps of:

reusing an existing fuel system's fuel filter, fuel lines, fuel lift pump and engine fuel inlet port, repurposing an existing systems fuel filter such that the fuel in the fuel filter does not directly flow into the engine fuel inlet port, positioning a fuel selector valve to minimize cross contamination of different fuels wherein the fuel selector valve is coupled between the fuel filter and the engine fuel inlet port, and modifying a fuel integration plate such that the fuel integration plate is coupled to the fuel selector valve and the fuel filter is mounted to the fuel integration plate such that the fuel filter is located in substantially the same position as in the fuel filter's original position in a single fuel delivery system.

8. A method of adapting a fuel system of claim 7, wherein the fuel filter is repurposed by adapting the fuel filter to run entirely under vacuum pressure created by the fuel lift pump.

9. A method of adapting a fuel system of claim 7, wherein the fuel integration is adapted to block a fuel filter outlet port wherein the fuel filter outlet port is designed to couple to the engine fuel inlet port in a single fuel system.

10. A method of adapting a fuel system of claim 7, wherein the fuel system utilizes the engine fuel inlet port such that the engine fuel inlet port is the singular entry point for fuel into an engine.

11. A method of adapting a fuel system of claim 7, wherein the integration plate is adapted to contain a pressure relief valve that is coupled to the fuel selector valve.

12. A method of adapting a fuel system of claim 7, wherein the integration plate is adapted to have at least one mounting point, wherein at least one mounting point couples with an engine mounting point, wherein the engine mounting point is adapted to couple with a fuel filter in a single fuel system.

13. A fuel integration plate adapted for use in a multi-fuel delivery system for an internal combustion engine comprising:

a fuel exit port disposed on an engine facing side of the fuel integration plate, wherein the fuel exit port is adapted to couple with an engine fuel inlet port, a shared fuel inlet port disposed on the fuel integration plate, where a plurality of fuels flow into the fuel integration plate and flow out of the fuel exit port, and at least one mounting point disposed on the fuel integration plate, wherein at least one mounting point couples with an engine mounting point, wherein the engine mounting point is adapted to couple with a fuel filter in a single fuel system.

14. A fuel integration plate of claim 13, wherein the fuel integration plate is adapted to couple with the fuel filter such that the fuel filter is located in substantially the same position as in the fuel filter's original position in a single fuel delivery system and the fuel filter mounts to at least one mounting point that is coupled with at least one engine mounting point.

15. A fuel integration plate of claim 13 wherein the fuel integration plate blocks a fuel filter outlet port wherein the fuel filter outlet port is designed to couple to the engine fuel inlet port in a single fuel system.

16. A fuel integration plate of claim 13, wherein the integration plate contains a pressure relief valve.

17. A fuel integration plate of claim 13, wherein the engine fuel inlet port is a singular entry point for fuel into an engine and the engine fuel inlet port is originally designed for use with a single fuel source.

18. A fuel integration plate of claim 13, wherein the fuel exit port is a threaded coupling that couples with the engine fuel inlet port.

19. A fuel delivery system for an internal combustion engine of claim 1, wherein the fuel selector valve individually selects one fuel source to be delivered to the engine fuel intake port.

20. A method of adapting a fuel system of claim 7, wherein the fuel selector valve individually selects one fuel source to be delivered to the engine fuel intake port.

\* \* \* \* \*